United States Patent [19]
Bak et al.

[11] Patent Number: 5,352,481
[45] Date of Patent: Oct. 4, 1994

[54] PROCESS FOR FORMING PARTICLES HAVING A UNIFORM SIZE DISTRIBUTION

[75] Inventors: Chan S. Bak, Newbury Park; Hiroshi Kimura, Northridge; Ricardo C. Pastor, Manhattan Beach, all of Calif.

[73] Assignee: Hughes Aircraft Company, Los Angeles, Calif.

[21] Appl. No.: 55,424

[22] Filed: Apr. 29, 1993

Related U.S. Application Data

[62] Division of Ser. No. 890,978, May 29, 1992.

[51] Int. Cl.$^5$ .............................................. B05D 7/00
[52] U.S. Cl. ................... 427/212; 427/213.3; 427/213.31; 427/213.34; 427/215; 427/419.3
[58] Field of Search ............ 427/221, 215, 212, 213.3, 427/213.31, 213.34, 419.3

[56] References Cited

U.S. PATENT DOCUMENTS

| | | | |
|---|---|---|---|
| 4,476,156 | 10/1984 | Brinker et al. | 427/82 |
| 4,652,467 | 3/1987 | Brinker et al. | 427/246 |
| 4,925,704 | 5/1990 | Sato et al. | 427/221 |
| 4,929,278 | 5/1990 | Ashley et al. | 106/287.12 |
| 5,112,676 | 5/1992 | Cot et al. | 427/226 |
| 5,123,940 | 6/1992 | Giovanni et al. | 65/3.12 |

OTHER PUBLICATIONS

Okamura et al., Comm. of Am. Ceramic Soc., 69, C-2-2-C-24 "Preparation and Sintering of Monosized Al$_2$O$_3$-TiO$_2$ Composite Powder". (1986).

Iler, Ralph K, "Inorganic Colloids for Forming Ultrastructures", *Science of Ceramic Chemical Processing*, pp. 3–20. (1986).

Hackh's Chemical Dictionary, Third Edn, McGraw-Hill Book Company, p. 139.

R. H. Heistand II et al., "Synthesis and Processing of Submicrometer Ceramic Powders", in *Science of Ceramic Chemical Processing*, pp. 482–496.

*Primary Examiner*—Shrive Beck
*Assistant Examiner*—David M. Maiorana
*Attorney, Agent, or Firm*—V. D. Duraiswamy; W. K. Denson-Low

[57] ABSTRACT

A process is provided for fabricating coated particles of a substantially uniform particle size. The process comprises coating small particles of well-defined crystalline phases with a polymerized gel. The process results in a ball-type sol-gel coating of the particles to provide particles which have a narrow size distribution. In many instances, crystalline particles of irregular shape have a substantially spherical shape upon coating with the sol-gel. In instances where the core is a high melting point material, such as an oxide, nitride, or carbide, the coat formulation can effect a low sintering temperature, which permits forming films of the particles at a much lower temperature than would otherwise be possible.

8 Claims, 6 Drawing Sheets

PROCESS FOR FORMING PARTICLES HAVING A UNIFORM SIZE DISTRIBUTION

This is a division of application Ser. No. 07/890,978, filed May 29, 1992.

BACKGROUND OF THE INVENTION

1. Field of the Invention

The present invention relates to small particles of well-defined crystalline phases, such as metals and oxides, sulfides, oxysulfides, nitrides, carbides, and the like thereof, and, more particularly, to such small particles coated with a polymerized gel to effect uniform particle size and to render desired physical and chemical properties at the particle surface. As used herein, the term "small particles" refers to particles having a diameter in the range of about 100 nm to a few micrometers.

2. Description of Related Art

Uniform particle sizes are desired in a variety of applications, such as screen-printing or layering of a phosphor-screen. Uniformity of the particles provides a higher density of packing than is obtained with particles of varying sizes.

Presently, many commercially-available powders which have a nominal particle size, actually have a rather broad distribution of particle sizes. While mechanical sieving is one technique to provide a more narrow range of particle sizes, such techniques are time-consuming, and add to the cost of the product.

Further, it is often desired to provide films of particles. However, due to the high temperatures required to sinter high melting point materials such as oxides, nitrides, borides, and carbides, cracking of the films often results.

R. K. Iler in "Inorganic Colloids for Forming Ultra-structures" and R. H. Heistand et al in "Synthesis and Processing of Submicrometer Ceramic Powders", both published in Science of Ceramic Chemical Processing, edited by L. L. Hench and D. R. Ulrich (Wiley-Interscience) 1986, disclose processes for producing particles of controlled sizes. The former reference discloses a sol-gel process for forming colloidal particles having diameters in the range of about 2 to 3 nm, considerably smaller than the particles under consideration herein. The latter reference discloses ceramic powders of controlled composition, crystallinity, size, and size distribution in a binary system, e.g., alumina-titania, achieved by reaction between the two components.

It is desired to provide powders having a substantially uniform particle size, with a narrow range of particle size distribution in a comparatively simple process. It is also desired to provide powders that may be sintered to form films, in which the sintering temperature is low enough to avoid cracking of the film.

SUMMARY OF THE INVENTION

In accordance with the invention, a process is provided for fabricating coated particles of a substantially uniform particle size. The process comprises coating small particles of well-defined crystalline phases with a polymerized gel. The process results in a ball-type sol-gel coating of the particles to provide particles which have a narrow size distribution. In many instances, crystalline particles of irregular shape have a substantially spherical shape upon coating with the sol-gel.

In instances where the core is a high melting point material, such as an oxide, nitride, or carbide, the coat formulation can effect a low sintering temperature, which permits forming films of the particles at a much lower temperature than would otherwise be possible.

BRIEF DESCRIPTION OF THE DRAWINGS

FIG. 1b is an X-ray diffraction (XRD) pattern of the titania particles of FIG. 1a;

FIG. 2b is an X-ray diffraction pattern of the silica gel spheres of FIG. 2a;

FIG. 3b is an X-ray diffraction pattern of the silica gel-coated titania particles of FIG. 3a.

DESCRIPTION OF THE PREFERRED EMBODIMENTS

Figure 1A:
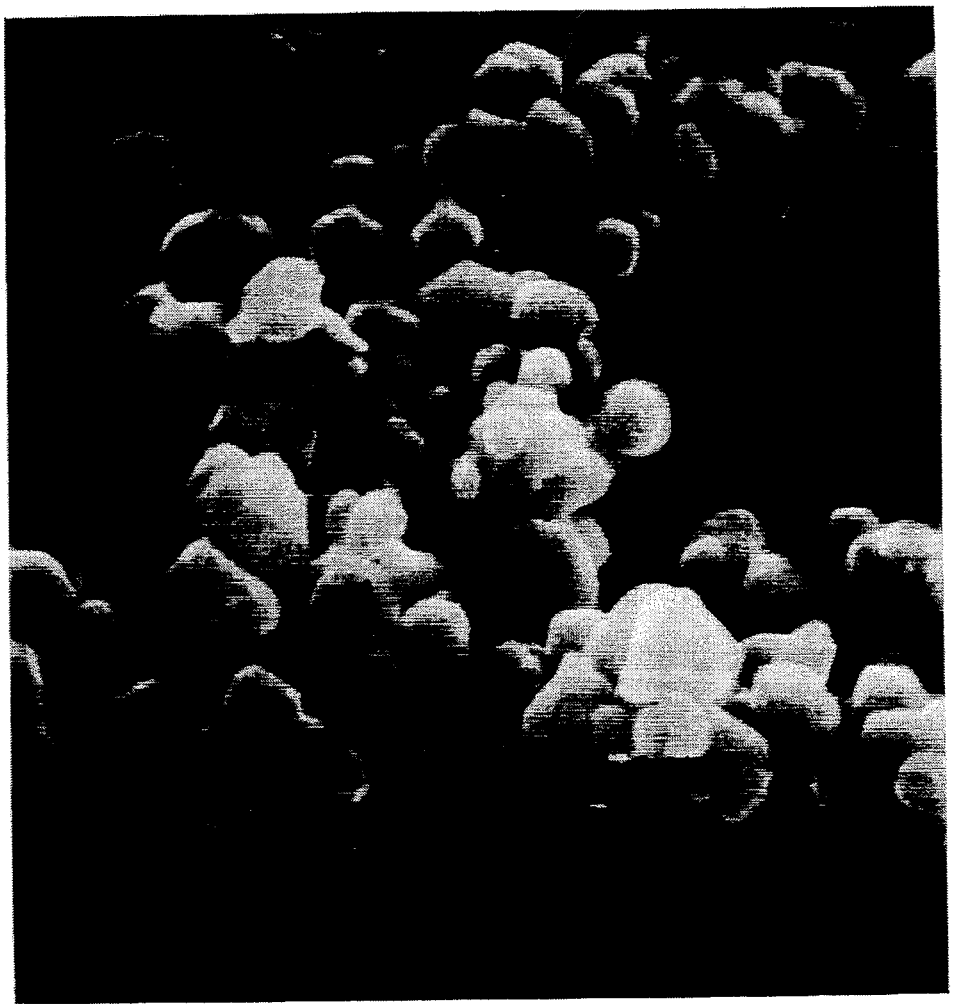
FIG. 1a is a scanning electron microscopy (SEM) photograph of commercial titania particles (rutile structure)

The process of the invention assumes the availability of the material (metal or oxide, sulfide, oxysulfide, nitride, carbide, etc. thereof), called "core particles" herein, in powder form with a convenient size distribution. By convenient size distribution is meant that the particles range from about 0.1 to 2 $\mu$m in diameter. This size range is required for processing, in which the core particles are suspended in a suitable vehicle for applying the coating thereto.

Examples of core particles useful in the practice of the invention include titania, alumina, zirconia, calcia, tin dioxide, aluminum nitride, and boron nitride.

The peak of the particle size distribution is chosen to allow for the coat thickness to be laid. The kinetics of sol-gel particle growth depends on particle size. The smaller particle has larger curvature and therefore grows faster, thus sharpening the size distribution of the coated particles with respect to the distribution of the core particles. That such curvature effect is dominant should cause particle growth to show no significant dependence on the nature of the metal species.

The powder is dispersed and suspended in a proper vehicle; that is to say, the vehicle is one in which the core particle is insoluble but in which the gel precursor is soluble. For example, when employing a metal alkoxide, such as silicon tetra-ethoxide, as the gel precursor for coating metal oxide particles, such as titania, ethanol is a suitable vehicle, since it serves to hold the titania particles in suspension and is a solvent for the silicon tetra-ethoxide. Failure to keep the gel precursor in solution would result in precipitation of the precursor and inability to coat the core particles.

Examples of other suspending media include the lower alkyl alcohols, such as methanol, n-propanol, and iso-propanol. These alcohols, together with ethanol, are very easy to obtain in anhydrous form and are reasonably priced. Higher alcohols are more expensive and are less fluid, a feature that works against effecting shorter periods to homogenize. Also, the higher alcohols tend to become more hydrophobic and limit the amount of $H_2O$ (hydrolysis agent) that can be introduced.

In the process of the invention, the metal alkoxide, which is dissolved in an alcohol, hydrolyzes in the presence of water, with loss of alcohol from the alkoxide, leaving a metal-oxide polymer. For example, silicon ethoxide hydrolyzes to form silica gel.

Metal alkoxides are desirably employed as gel precursors in the practice of the invention. The metal may comprise silicon, bismuth, boron, titanium, tantalum, zirconium, aluminum, and the like. The alkoxide moiety comprises one or more $C_1$ to $C_5$ alkoxy groups, that is, methoxy, ethoxy, propoxy, butoxy, and pentoxy.

There are many forms of sol-gels, such as ball-type, fiber-type, and cotton-type. These refer to the various configurations the sol-gel may take. In the practice of the invention, it is desired that the metal alkoxide, the solvent, and the pH of the solution be chosen to result in the formation of the ball-type sol-gel. The parameters required for the formation of ball-type sol-gels are known in the art.

Growth geometry which subsequently follows nucleation is influenced by adsorption which, in turn, depends on the nature of the solvent, pH, intentional presence of low-level dopant, etc. A well-known example is NaCl aqueous-solution crystal-growth following nucleation. Saturated aqueous solution at pH less than 4 yields the characteristic hopper growth of small cubes. At pH of about 5, in the presence of a low concentration of urea, subsequent growth yields small octahedra. In the former case, growth along <100> is slowest, while in the latter case, the slow-growth direction is <111>. Each case has to be studied, as there are no a priori rules to predict the morphology of growth. However, such study is not considered to constitute undue experimentation to one skilled in this art, based on the teachings herein.

The core powder is suspended in the suspending agent/solvent. The gel precursor, in solution, is then added, together with a quantity of water. The amount of precursor used is determined by the amount of core powder employed and the projected thickness of the coating.

Typically, a ratio in the range of about 1:4 to 4:1 of core powder to gel precursor is employed. The more regular the shape of the core powder particles, the higher the ratio of core powder to gel precursor.

One way to determine the amount of precursor is as follows: The specific surface (say, as determined by the well-known BET method) of the core-powder gives the surface area per unit weight. A coat density value close to the amorphous form is a satisfactory approximation. Thus, the weight of the precursor per unit weight of core material per unit thickness of coating is known.

A critical parameter of the process is that the relaxation time to effect adsorption of the precursor material by the dispersion is quite short compared to the time it takes to "fix" the coat (polymerization, hydrolysis, condensation, etc.). The precursor will gel even in the region devoid of core material, an undesired competing process. Adsorption of coating by core particle is a fast process. Adsorbed precursor, in a higher energy state than dissolved material, will gel ahead of the region devoid of core material. The ensuing depletion of precursor material works against gelation of the devoid region. To a rough approximation, the process conditions should be arranged so that the period which precedes gelation in the homogeneous case (i.e., no suspension of core particles) is sufficiently extended to allow homogeneous mixing of core suspension and precursor solution.

The figure of merit to the process is the fraction of the end-product that is the coated powder. Preferably, that fraction is as close to one as possible. One minus that fraction is, of course, the gel-spheres with no core material.

The assay can be made through sedimentation, there being a difference in the density of the coated versus the uncoated particles. The same process can be used to refine the product.

It is desired that the hydrolysis proceed slowly, compared to the adsorption of the precursor material by the core particles, as mentioned above. This is controlled by the amount of water employed in the hydrolysis. For example, when using silicon tetra-ethoxide, for each mole of metal alkoxide employed, about two to ten moles of water should be used. If less than about two moles of water are used, then there is not enough water to ensure totally complete hydrolysis, while if more than about ten moles of water are used, then the hydrolysis reaction proceeds at too fast a rate. While each particular metal alkoxide system has its own requirements for the amount of water employed, the amount of water is readily determined.

Each particular metal alkoxide presents a separate case for study. Even for a given metal, the behavior differs with the nature of the alkoxide. For example, TMOS or $Si(OCH_3)_4$ will hydrolyze completely to $Si(OH)_4$ before undergoing condensation. Thus, the oxide bridge is formed by removal of water:

$$2\ Si(OH)_4 \rightarrow H_2O + (HO)_3Si\text{-}O\text{-}Si(OH)_3,\ etc.$$

However, this is not so in the case of TEOS, or $Si(OC_2H_5)_4$, where condensation starts as early as the monosilanol stage of hydrolysis. Thus, the oxide bridge is formed by removal of alcohol ($C_2H_5OH$; ethanol):

$$(C_2H_5O)_3Si\text{-}OH + C_2H_5O\text{-}Si(OC_2H_5)_3 \rightarrow C_2H_5OH + (C_2H_5O)_3Si\text{-}O\text{-}Si(OC_2H_5)_3,\ etc.$$

It is also known that, in the case of TEOS, increasing the amount of water (one of the reactants), introduced as diluted ethanol, does not proportionately increase the rate of hydrolysis. As a matter of fact, that behavior indicates that the rate-limiting step does not depend on $H_2O$ concentration. However, it is catalytically influenced by the presence of acid (or base). Experimentation with each case establishes the desired set of process parameters (amount of catalyst, molar ratio of metal alkoxide to water, temperature).

There may be instances in which more than one coating is applied to the core particles. For example, a silica-gel can be formed on the surface of the core particles, followed by, e.g., a coating of a bismuth oxide ($Bi_2O_3$) gel thereover. The formation of the second, or subsequent, coating is done following the same procedures as the first coating.

The use of a bismuth oxide gel outer coating permits film formation by sintering the coated particles at a temperature below about 900° C., specifically, at the relatively low temperature of about 860° C., which is the melting point of this oxide. This lower sintering temperature results in less shrinking of the film, and hence fewer cracks. Such films of coated particles find a variety of uses in microelectronics, as in capacitors, inductors, resistors, and the like.

EXAMPLES

Commercial $TiO_2$ powder particles (rutile, from E. I. DuPont de Nemours & Company, Wilmington, Del.), about 0.2 μm in diameter, were suspended in ethanol containing a controlled amount of water and ammonium hydroxide. Here, five moles of water were employed for each mole of the metal alkoxide. The ammonium hydroxide was used to adjust the pH of the solution to 10. An ethanol solution of silicon tetra-ethoxide was introduced. The ethanol solution was in excess; the amount of silicon tetra-ethoxide was about four times that of the titania particles, and provided a ratio of $TiO_2:SiO_2$ of about 1:1.6.

Crucial kinetics sequence of the process is that adsorption of the silica-precursor by $TiO_2$ particles would be the faster step and would be followed by gelation. Demonstration of having effected that sequence is now made.

Figure 1B:
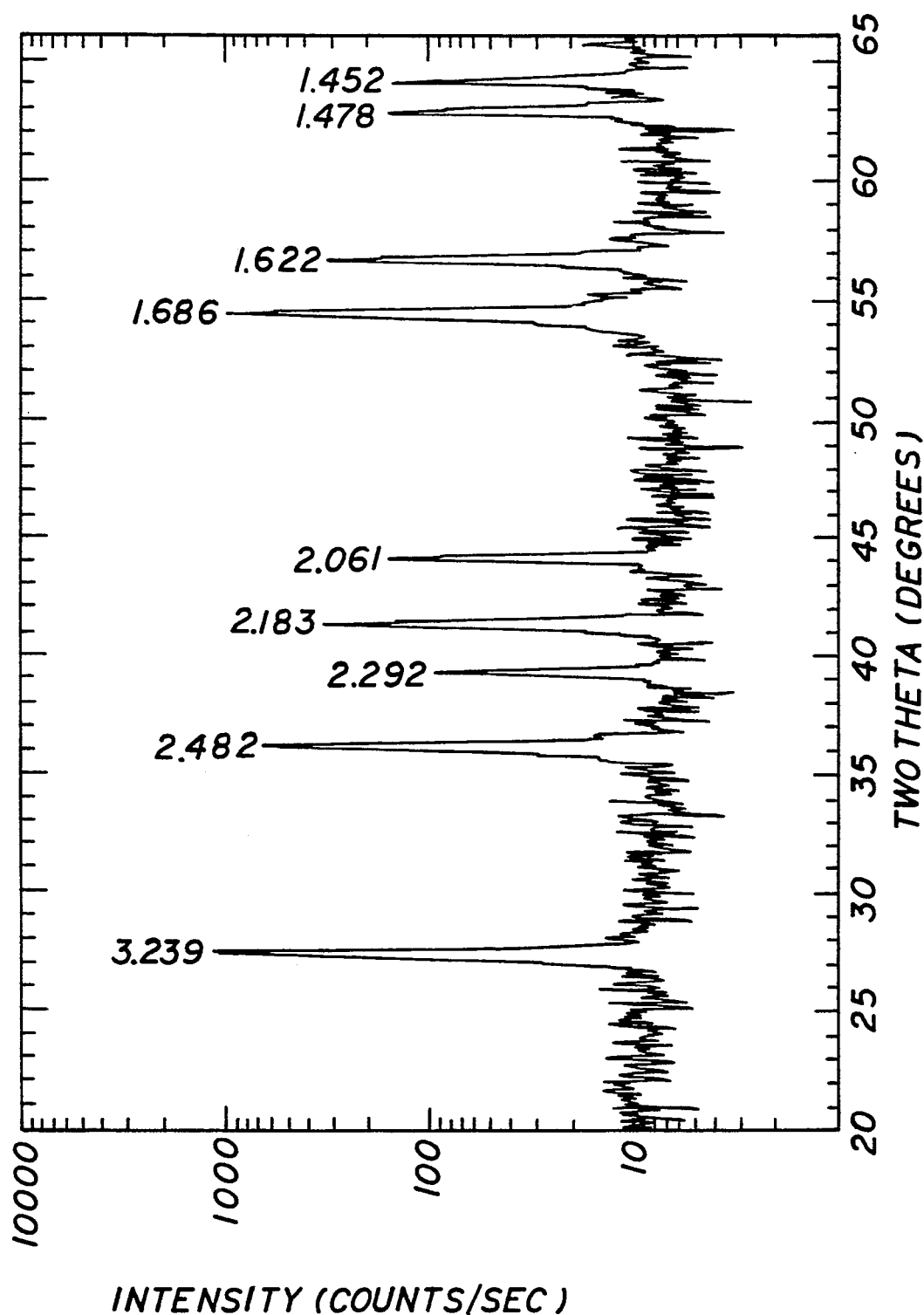

Results: X-ray diffraction and SEM photographs were taken. FIG. 1a gives the SEM photograph and FIG. 1b gives the X-ray diffraction (XRD) trace of the as-received commercial $TiO_2$ particles. According to the SEM results, the particle size distribution appears to be fairly broad, with particle diameter of about 0.2 to 0.3 micrometer. Powder-XRD confirms the rutile structure.

Figure 2A:
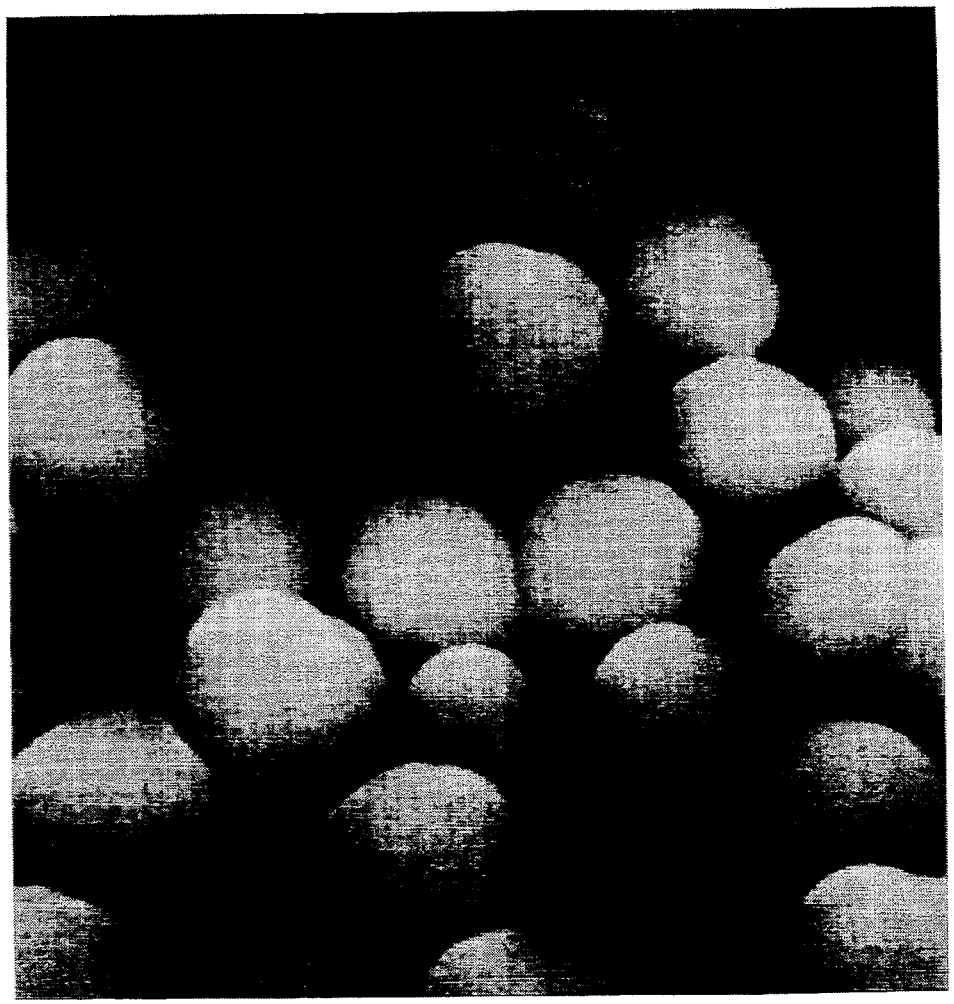
FIG. 2a is a scanning electron microscopy photograph of amorphous silica gel spheres.
Figure 2B:
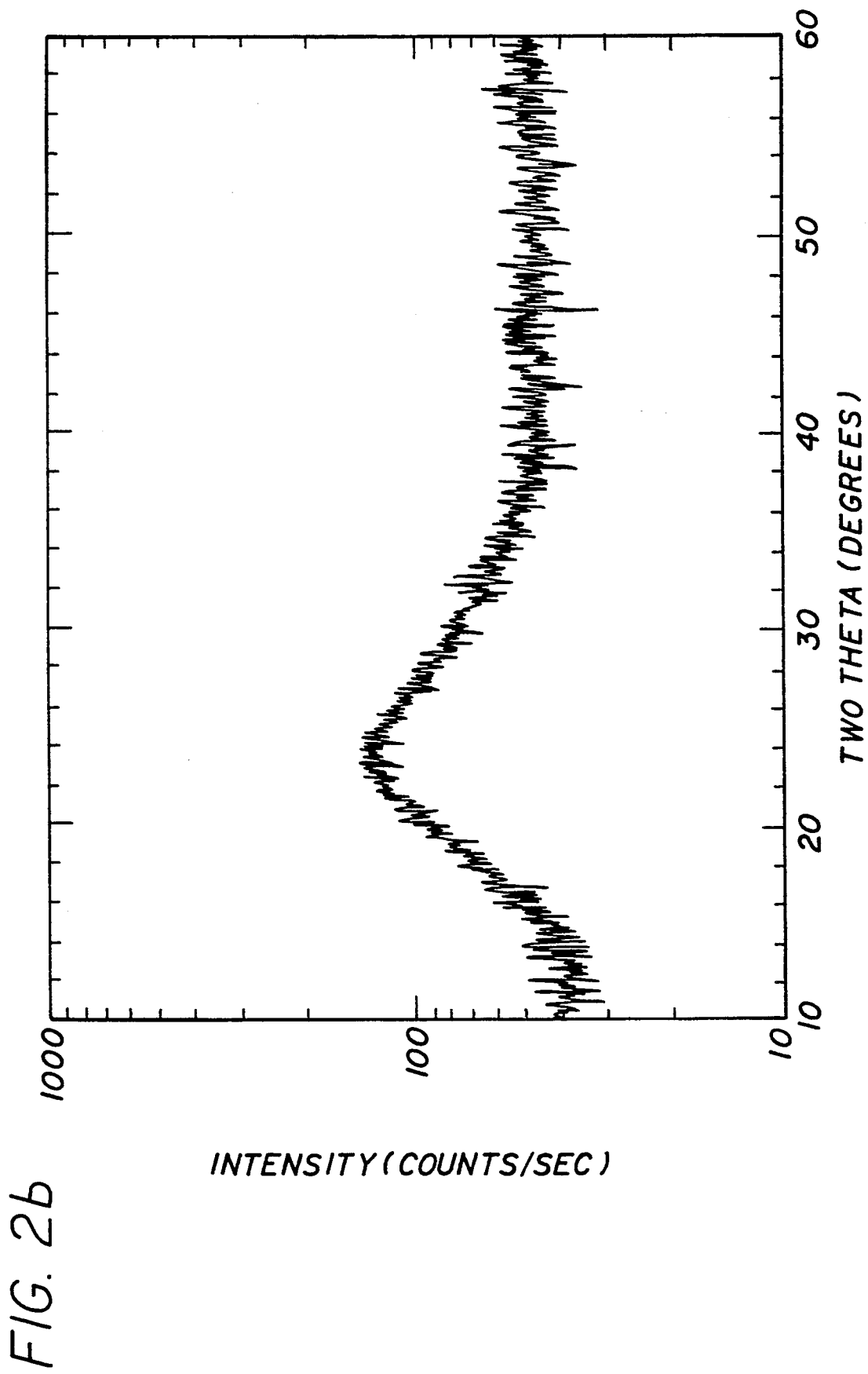

FIGS. 2a and 2b give the respective SEM photograph and XRD trace for the case of silicon tetra-ethoxide gelled without the suspension of $TiO_2$ particles. The powder-XRD shows only an amorphous structure. The SEM photograph shows a fairly sharp size distribution of gel spheres at about 0.5 $\mu$m.

Figure 3A:
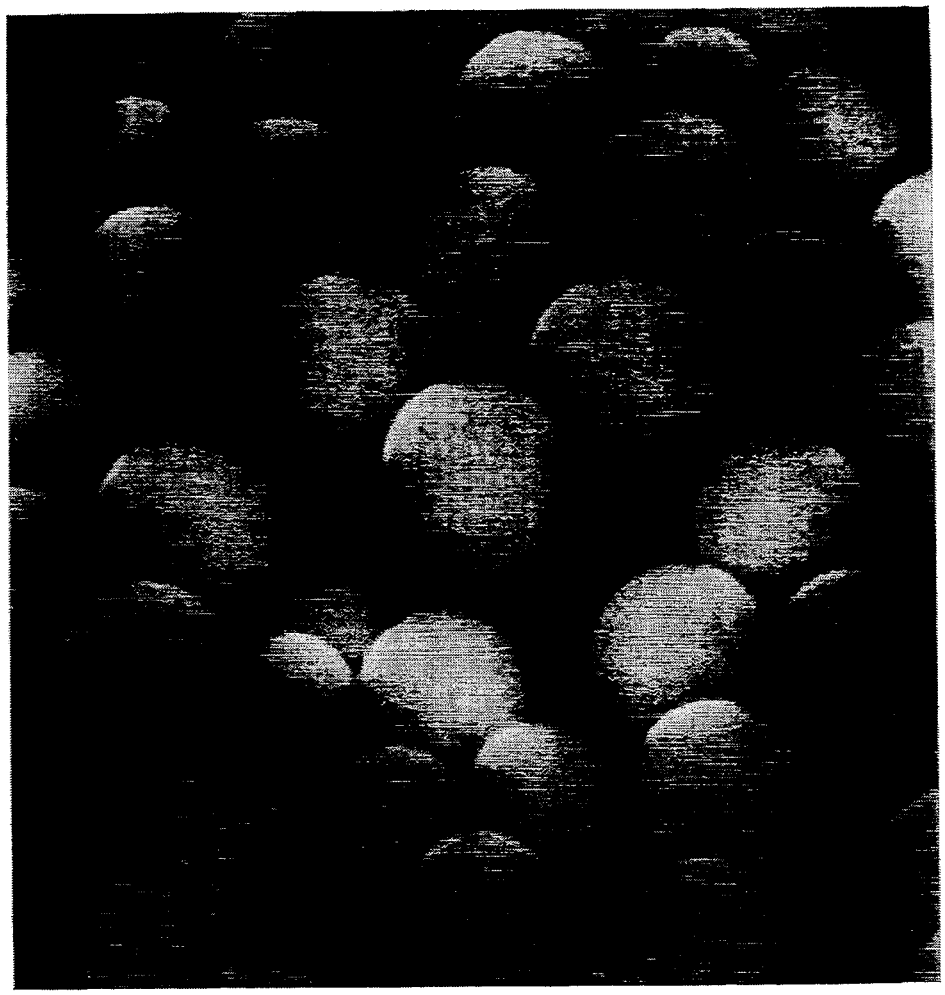
FIG. 3a is a scanning electron microscopy photograph of commercial titania particles coated with amorphous silica gel.
Figure 3B:
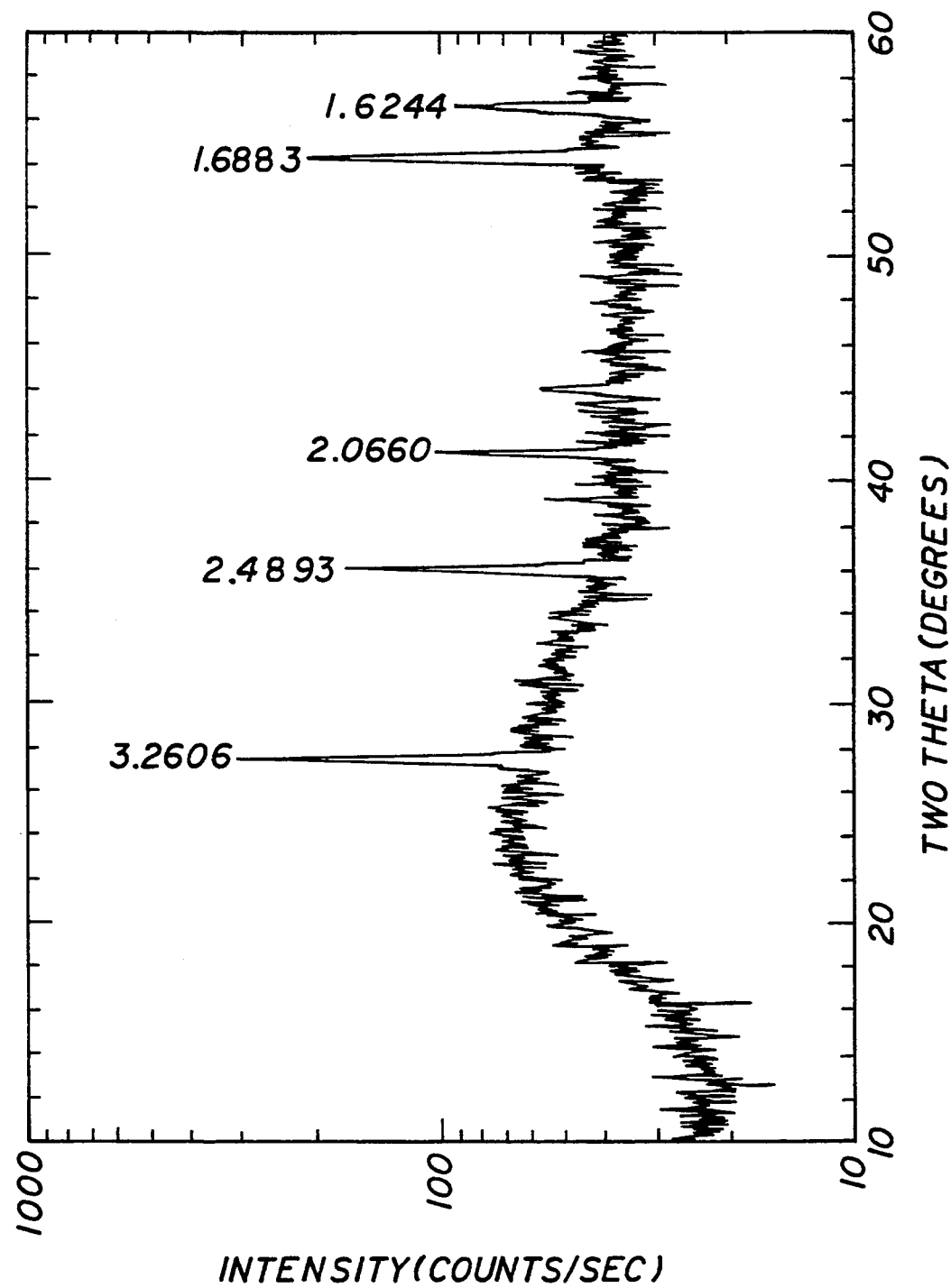

FIGS. 3a and 3b give the respective SEM photograph and XRD trace for the case where the gelation was carried out in the presence of a suspension of $TiO_2$ particles. The powder-XRD shows a composite diffractogram: the amorphous part is due to the silica-gel coating, while the crystalline part is due to the rutile structure of the core.

Thus, the correct kinetic sequence has yielded a uniform, high-density silica sphere of about 0.5 $\mu$m diameter with a titania core. That the silica sphere has a high density may be gathered from the preceding discussion; empty spheres will take a longer time to sediment than those spheres which have a particle at the core.

Thus, there has been disclosed sol-gel coated core particles and a process for their fabrication. Several changes and modifications of an obvious nature may be made, which will be readily apparent to those skilled in this art, and all such changes and modifications are considered to fall within the scope of the invention, as defined by the appended claims.

What is claimed is:

1. A process for forming particles having a substantially uniform size distribution and provided with an outer coating having a melting point of less than 900° C. to enable sintering of said particles at a temperature less than 900° C., comprising:
    (a) providing titania powder comprising core particles of irregular shape and broad particle size distribution;
    (b) coating said titania powder with a first coating consisting essentially of a silica gel by
        (1) suspending said powder in a suspending medium consisting essentially of an alcohol, said suspending medium acting as a solvent for a silicon alkoxide and containing a quantity of water,
        (2) adding said silicon alkoxide to said suspending medium, and
        (3) allowing said silicon alkoxide to hydrolyze and condense on the surface of said core particles to form said silica sol-gel; and
    (c) coating said first coating of silica gel with a second coating consisting essentially of a bismuth oxide gel by
        (1) suspending said silica-gel coated particles in an alcohol, said alcohol acting as a solvent for a bismuth alkoxide and containing a quantity of water,
        (2) adding said bismuth alkoxide to said suspending medium, and
        (3) allowing said bismuth alkoxide to hydrolyze and condense on the surface of said first coating of silica gel to form said second coating of said bismuth oxide gel.

2. The process of claim 1 wherein said core particles have a particle size ranging from about 0.1 to 2 $\mu$m.

3. The process of claim 1 wherein said alcohol is selected from the group consisting of methanol, ethanol, n-propanol, and iso-propanol.

4. The process of claim 1 wherein said bismuth alkoxide comprises an alkoxy group comprising from 1 to 5 carbon atoms.

5. A process for forming particles having a substantially uniform size distribution and provided with an outer coating having a melting point of less than 900° C. to enable sintering of said particles at a temperature less than 900° C., comprising:
    (a) providing titania powder comprising core particles of irregular shape and broad particle size distribution;
    (b) coating said titania powder with a first coating consisting essentially of a silica gel by
        (1) suspending said powder in ethanol containing a quantity of water and a pH-adjusting agent,
        (2) adding silicon tetra-ethoxide to said ethanol, and
        (3) allowing said silicon tetra-ethoxide to hydrolyze and condense on the surface of said titania powder to form said silica gel; and
    (c) coating said first coating of silica gel with a second coating consisting essentially of a bismuth oxide gel by
        (1) suspending said silica-gel coated particles in an alcohol, said alcohol acting as a solvent for a bismuth alkoxide and containing a quantity of water,
        (2) adding said bismuth alkoxide to said suspending medium, and
        (3) allowing said bismuth alkoxide to hydrolyze and condense on the surface of said first coating of silica gel to form said second coating of said bismuth oxide gel.

6. The process of claim 5 wherein said core particles have a particle size ranging from about 0.1 to 2 $\mu$m.

7. The process of claim 5 wherein said alcohol is selected from the group consisting of methanol, ethanol, n-propanol, and iso-propanol.

8. The process of claim 5 wherein said bismuth alkoxide comprises an alkoxy group comprising from 1 to 5 carbon atoms.

* * * * *